(12) United States Patent
Burton

(10) Patent No.: US 9,289,870 B2
(45) Date of Patent: Mar. 22, 2016

(54) CUTTING APPARATUS AND DRIVE ASSEMBLY

(75) Inventor: Mark Burton, Kendal (GB)

(73) Assignee: Furmanite Worldwide, Inc., Houston, TX (US)

( * ) Notice: Subject to any disclaimer, the term of this patent is extended or adjusted under 35 U.S.C. 154(b) by 210 days.

(21) Appl. No.: 14/005,533

(22) PCT Filed: Mar. 13, 2012

(86) PCT No.: PCT/GB2012/000238

§ 371 (c)(1),
(2), (4) Date: May 28, 2014

(87) PCT Pub. No.: WO2012/123697

PCT Pub. Date: Sep. 20, 2012

(65) Prior Publication Data

US 2014/0321932 A1    Oct. 30, 2014

(30) Foreign Application Priority Data

Mar. 16, 2011    (GB) .................................. 1104390.8

(51) Int. Cl.
*B23Q 5/00*        (2006.01)
*B23Q 5/32*        (2006.01)
(Continued)

(52) U.S. Cl.
CPC ............. *B23Q 5/326* (2013.01); *B23B 47/00* (2013.01); *F16L 41/04* (2013.01); *B23Q 5/06* (2013.01);
(Continued)

(58) Field of Classification Search
CPC .... B23Q 5/06; B23Q 2005/005; B23Q 5/142; B23Q 5/147; B23Q 5/326; B23Q 5/32; Y10T 408/68; Y10T 408/73
USPC ............ 173/178, 216, 176, 19; 475/299, 265, 475/286, 298
See application file for complete search history.

(56) References Cited

U.S. PATENT DOCUMENTS 2,646,699 A * 7/1953 Mueller ................... B23Q 5/32
173/145
2,884,808 A * 5/1959 Mueller ................. B23Q 5/142
475/296

(Continued)

FOREIGN PATENT DOCUMENTS

CN    201214157 Y    4/2009
GB    1097822 A  *  1/1968  ............... B23Q 5/32
JP    54137188 A    10/1979

OTHER PUBLICATIONS

PCT, International Search Report for PCT/GB2012/000238 issued on Sep. 7, 2012.

(Continued)

*Primary Examiner* — Daniel Howell
*Assistant Examiner* — Chwen-Wei Su
(74) *Attorney, Agent, or Firm* — The Culbertson Group, PC; Nathan H. Calvert; Russell Culbertson

(57) ABSTRACT

A boring apparatus, such as a drilling apparatus for forming holes in pressurized pipes, comprises a cutting head (5) mounted to a distal end of a boring bar (2) which is itself connected to a feed screw (3) by a feed nut so that relative rotation between the boring bar (2) and the feed screw (3) cause the cutting head (5) and boring bar (2) to traverse axially along the feed screw (3) while the cutting head (5) is rotated for cutting. The apparatus has a main drive motor arranged to drive the cutting head (5), boring bar (2) and a main drive shaft (4). The main drive shaft (4) and the feed screw (3) are operably connected at the proximal end through a pair of adjacent coaxial planetary gear assemblie (6) whose planetary gear carriers are liked to rotate in unison about the axis. An independent, primary feed drive motor is geared to a planetary gear ring (20) and is operable to provide a difference in rotation velocities between the feed screw (3) and boring bar (2) whereby the movement of the cutting head (5) and boring bar (2) to and from along the axis may be controlled.

13 Claims, 4 Drawing Sheets

Figure 1:
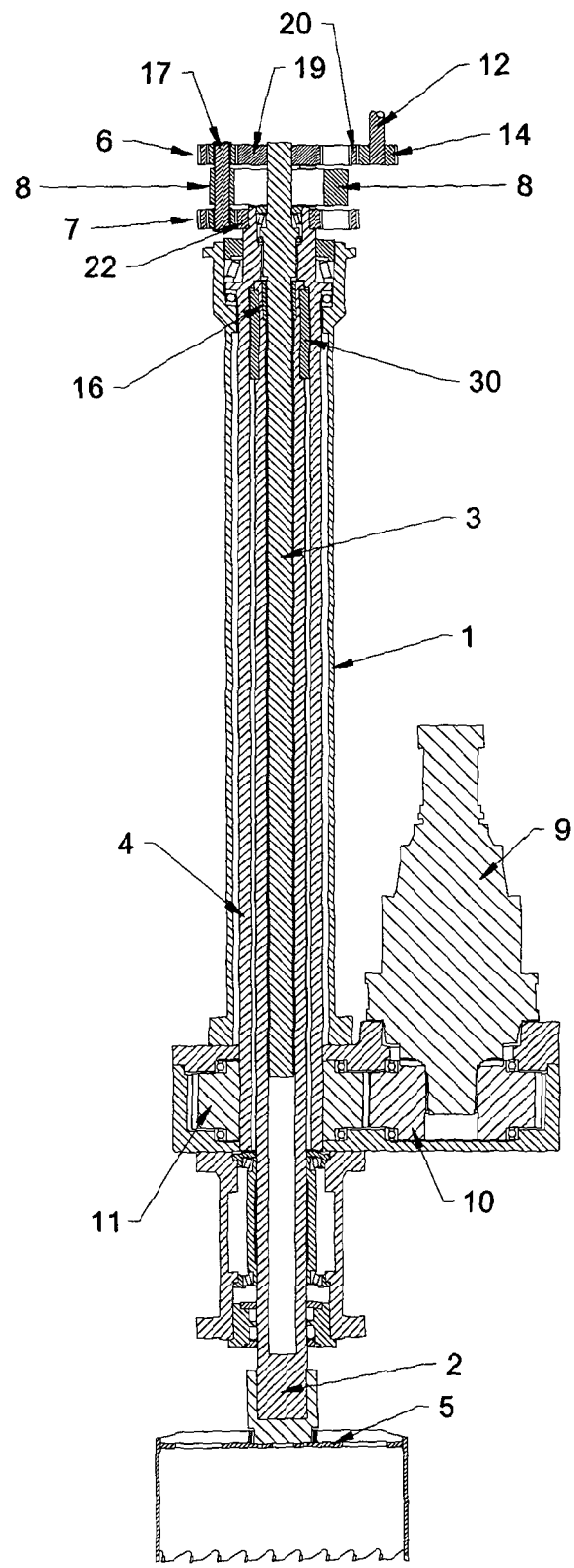

(51) Int. Cl.
*B23B 47/00* (2006.01)
*F16L 41/04* (2006.01)
*B23Q 5/06* (2006.01)

(52) U.S. Cl.
CPC ......... *B23Q 2005/005* (2013.01); *Y10T 408/03* (2015.01); *Y10T 408/21* (2015.01); *Y10T 408/375* (2015.01); *Y10T 408/68* (2015.01); *Y10T 408/73* (2015.01)

(56) References Cited

U.S. PATENT DOCUMENTS

| | | | | |
|---|---|---|---|---|
| 3,117,492 | A | * | 1/1964 | Muller ..................... B23Q 1/70 29/26 R |
| 3,493,057 | A | * | 2/1970 | Peterson ................. B23Q 5/32 173/177 |
| 3,552,238 | A | * | 1/1971 | Quackenbush ........ B23Q 5/261 408/10 |
| 3,885,635 | A | * | 5/1975 | Menzel .................. B23Q 5/326 173/146 |
| 3,955,629 | A | * | 5/1976 | Turner ..................... B23Q 5/10 173/146 |
| 5,755,537 | A | * | 5/1998 | Lubbering ........... B23Q 1/0036 408/10 |
| 2008/0260485 | A1 | | 10/2008 | Jaillon et al. |

OTHER PUBLICATIONS

PCT, Written Opinion for PCT/GB2012/000238 issued on Sep. 17, 2013.

* cited by examiner

CUTTING APPARATUS AND DRIVE ASSEMBLY

FIELD

The present invention relates to boring equipment such as cutting, drilling or milling equipment and methods of operation for such equipment. In particular it is concerned with large scale industrial drilling apparatus where it is required to traverse a cutting head along the rotation axis of the cutting head so that the position and velocity of the cutting head relative to a workpiece, such as a pipe to be drilled, may be controlled in a precise and continuously variable manner, even whilst the cutting head is rotating or whilst cutting of the workpiece is underway.

The invention is particularly relevant for hot-tap drilling apparatus, such as a drilling apparatus for forming holes in pressurised pipes.

BACKGROUND

A typical large scale industrial drilling apparatus comprises a cutting head mounted to a distal end of a hollow boring bar which is concentric with an internal feed screw. The proximal end of the boring bar incorporates a feed nut which engages on the feed screw so that relative rotation between the boring bar and the feed screw causes the cutting head and boring bar to traverse axially along the feed screw whilst the cutting head is rotated for cutting. A main drive motor, typically including a reduction gearbox, is used to rotate the boring bar and cutting head. So-called hot-tap drilling apparatus is often of this design. Such apparatus is for use in forming holes in walls of pipes whilst contents are still inside and perhaps under pressure. The cutting head is typically in the form of a hole saw arrangement and the boring bar is provided with sealing means so that the pressurised contents of the pipe are neither released nor enter the drive arrangements of the hot-tap drilling apparatus.

A typical operation would involve positioning the boring apparatus over the pipe to be drilled and advancing the cutting head to come into contact with the pipe wall. With the cutting head rotating, driven by the main drive motor, the cutting head is advanced into contact with the pipe wall and fed along the axis of the feed screw at a low feed rate such as 0.1 or 0.2 mm/revolution. In order to achieve such feed rates for the cutting head, the difference in rotational velocity between the boring bar and the feed screw may need to be about 1% or less of the rotational velocity of the cutting head and boring bar. Cutting heads may be operated at rotational velocities from say 2 to 20 rpm, or with even higher rotational speeds up to 40 or 60 rpm, with required feed rates from say 0.1 to 1 mm/revolution. Higher feed rates are typically only required for cutting heads with many teeth and these are typically driven at low rotation velocities.

Prior art industrial boring equipment of this type generally has a feed gear box, driven by the main drive motor which drives the rotation of the boring bar/cutting head. The output from feed gear box is arranged to have a small difference in rotational velocity compared to the input rotational velocity from the main drive motor. This output from the feed gearbox is used to drive the feed screw so that a small difference in rotational velocities between the feed screw and the main cutting head drive may be achieved. Most apparatuses have only one ratio available from the feed gear box, so that only one feed rate per revolution is available, though some apparatuses now on the market have up to four different selectable gear ratios to provide distinct, different feed rates.

Another solution in the prior art involves the use of separate drive motors for the cutting head and for the feed screw. This arrangement requires no gear box to apportion the drive between the cutting head and the feed screw. Instead, the cutting head and the feed screw are driven independently by two individual, separate motors. In the prior art these are hydraulic motors. Such motors may be independently controllable with sufficient accuracy to provide a small difference in rotational velocity between drive shaft and cutting head. Control of the feed rate for the cutting head requires close control of the two drive motors because the feed rate is proportional to the difference between the two motor rotation velocities.

Although this solution has the benefit of mechanical simplicity and provides scope for continuous variability of feed rate, it requires either both constant monitoring and manual adjustment of the different motor speeds, or a sophisticated electro-hydraulic control system, in order to maintain the uniform difference between the two motor speeds to provide a constant feed rate for the boring bar/cutting head. This type of boring equipment is typically for use in hostile outdoors conditions, and so any control system, such as a computer, will need to be made extremely rugged to withstand harsh environmental conditions and/or weather. Furthermore, the electrical components essential to a control system mean that the apparatus may need complex sealing systems in place (for instance to avoid risk of explosions when working with gas, or fuels in pipes to be drilled or to avoid risk of short circuits when working on water pipes).

The accuracy required for controlling the speed difference between two drive motors, for the feed rates required, means that an arbitrary speed variation of +/−0.25% in the cutting head and feed screw motor rotation rates can give rise to variations in feed rate of +/−55% or more.

When the cutting head is being used for cutting through a pipe wall, a slow, preferably variable, feed rate is desirable. However, when moving the cutting head towards the pipe wall to commence cutting, or away from the pipe wall after cutting operations have been completed, or during an emergency shutdown, it is desirable to be able to traverse the cutting head axially at much more rapid feed rates than those required for cutting. In other words, it is desirable to be able to provide controlled rapid axial movement in addition to the slow axial feed rates suitable for cutting operations.

Hence there is a need for boring apparatus, and methods for operation of boring apparatus, which address or overcome some or all of the problems mentioned above. In particular, there is a need for boring apparatus which can be operated with a continuously variable feed rate over a wide range of feed rates, with high consistency of feed rate.

SUMMARY OF THE INVENTION

It is one object of the invention, amongst others, to provide a boring apparatus, and associated methods of operation, particularly for hot-tap drilling equipment, which improve upon or overcomes at least some of the problems in the prior art, including those problems set out hereinbefore or otherwise known.

It is a further object of the invention to provide a boring apparatus which can be operated with a continuously variable feed rate, consistently maintainable at a constant, selected feed rate, without the need for electro-hydraulic, electronic or computerised control of drive motor speeds, over a wide range of feed rates. It is a further object of the invention to provide an apparatus and method of operation whereby rapid, controllable axial movement of a cutting head to or from the workpiece is provided in addition to the slow, continuously variable feed rates required whilst cutting is underway.

A first aspect of the invention provides a boring apparatus comprising:
- a feed screw mounted to rotate about its axis having a first planetary gear assembly at its proximal end,
- a cutting head and boring bar assembly coaxially mounted on the feed screw by a threaded sleeve at its proximal end whereby rotation of the threaded sleeve by one full rotation relative to the feed screw causes movement of the cutting head and boring bar by a distance P along the axis,
- a tubular drive shaft coaxially mounted around the feed screw, operably connected to the cutting head to rotate therewith, and having a second planetary gear assembly at its proximal end, situated adjacent to and distally situated with respect to the first planetary gear assembly,
- a drive motor operably connected to rotate the tubular drive shaft and cutting head at a cutting rotation velocity, from zero up to a maximum cutting rotation velocity, about the axis,
- wherein the carriers of the planet gears of the first and second planetary gear assemblies are rigidly interconnected, whereby the carriers rotate in unison about the axis,
- wherein a primary feed motor is arranged to drive a primary feed drive shaft operably geared to a ring gear of one of the planetary gear assemblies whereby that planetary gear assembly is rotatably drivable by the primary feed motor to act as a primary feed planetary gear assembly, and
- wherein the ring gear of the other planetary gear assembly is arrangeable to be held with zero rotational speed or to be independently rotatable about the axis.

The primary feed drive shaft may, for instance, be directly geared to the external face of the ring gear of one of the planetary, gear assemblies, or for instance, to the internal face thereof.

The boring apparatus of the first aspect of the invention may further comprise a secondary feed motor having a secondary feed drive shaft operably geared to the ring gear of the other planetary gear assembly whereby the other planetary gear assembly is rotatably drivable by the secondary feed motor to act as a secondary feed planetary gear assembly.

A second aspect of the invention provides a method for controlling axial movement of the cutting head of a boring apparatus according to the first aspect of the invention whilst the cutting head is rotating at a cutting rotation velocity $\omega_1$, the method comprising:
operating the primary feed drive motor to drive the primary feed drive shaft at rotation velocity $\omega_2$ with the ring gear of the other or secondary feed planetary gear drive held with rotation velocity zero, whereby the feed screw is driven through the first and second planetary gear assemblies at a rotation velocity $(\omega_1 + k \cdot \omega_2)$ wherein k is a gear ratio, whereby the relative rotational velocity between the feed screw and the boring bar is $k \cdot \omega_2$, causing the cutting head and boring bar to move axially along the feed screw at a rate $P \cdot k \cdot \omega_2$.

The value and sign of k is determined by the proportions of the planetary gear assemblies and the gear ratio between a drive pinion of the primary feed drive shaft of the primary feed motor and the gear teeth on the ring gear being driven by the drive pinion of the primary feed drive shaft.

When the apparatus of the first aspect of the invention further comprises a secondary feed motor arranged to drive a secondary feed drive shaft operably geared to a face of the ring gear of the other planetary gear assembly to act as a secondary feed planetary gear assembly, the method of the second aspect of the invention may comprise operating the secondary feed drive motor to drive the secondary feed drive shaft at rotation velocity $\omega_3$, whereby the feed screw is driven through the first and second planetary gear assemblies at a rotation velocity $\omega_1 + k\omega_2 - k' \cdot \omega_3$, whereby the relative rotational velocity between the feed screw and the boring bar is $k\omega_2 - k' \omega_3$, causing the cutting head and boring bar to move axially along the feed screw at a rate $P \cdot (k \cdot \omega_2 - k' \cdot \omega_3)$.

The value and sign of k' is determined by the proportions of the planetary gear assemblies and the gear ratio between a drive pinion of the secondary drive shaft of the secondary feed motor and the gear teeth on the ring gear being driven by the drive pinion of the secondary feed drive shaft.

DETAILED DESCRIPTION OF THE INVENTION

Throughout this specification, the term "comprising" or "comprises" means including the component(s) specified but not to the exclusion of the presence of others. The term "consisting essentially of" or "consists essentially of" means including the components specified but excluding other components except for components present for an incidental purpose other than that of achieving the technical effect of the invention. Whenever appropriate, the use of the term "comprises" or "comprising" may also be taken to include the meaning "consists essentially of" or "consisting essentially of".

Throughout the specification, the term "axial" refers to the long axis of tubular, cylindrical, annular, circular or toroidal components, such as shafts or sleeves, where the long axis is normal to the circular cross-sectional plane of the components, passing through the respective centroid. The term "radial" means along a radius of such a component, normal to the long axis, either in a direction towards, or away from the long axis.

The term "pipe" as used herein means a substantially cylindrical hollow tube having an inner face which is circular in cross section and an outer face, also substantially circular in cross section.

The term "planetary gear assembly" is well known in the art and refers to a coaxial, coplanar arrangement of gears having a central toothed gear, called a sun gear, around which one or more toothed planet gears orbits, between the sun gear and an annular ring gear surrounding both the sun gear and the planet gears. Typically, for the sake of mechanical stability, a plurality of evenly spaced, toothed planet gears is employed. The ring gear is toothed on its inside face to engage with the planet gears, and in this invention, the ring gear may also be toothed on its outside or external face to enable it to be driven by feed drive shafts, as set out hereinafter, although in some arrangements, the ring gear may be driven by gearing the drive shafts to an inside face of a ring gear.

Throughout this specification, rotation about the axis of the feed and drive shafts, or about an axis parallel to the axis in a clockwise direction, as viewed looking along the axis from the proximal end, towards the distal end, is treated as having positive rotational velocity, with anticlockwise rotation having negative rotational velocity. Rotational velocity is used to mean angular velocity in this specification, with the term velocity including the speed and direction of rotation whereas the term speed means the scalar magnitude of the velocity of rotation. The scalar magnitude (rotation speed) of a rotational velocity $\omega$ is denoted by $|\omega|$ herein.

A first aspect of the invention provides a boring apparatus, having a feed screw mounted to rotate about its axis. A cutting head and boring bar is coaxially mounted on the feed screw by a threaded sleeve known as the feed nut, which is incorporated in the proximal end of the boring bar. Rotation of the feed nut by one full rotation relative to the feed screw causes movement of the boring bar and cutting head by a distance P along the axis. P is the pitch of the thread arrangement of the feed screw. This relative rotational motion between the feed screw and the boring bar is used to control the position of the cutting head relative to the feed screw. The feed screw is provided with a first planetary gear assembly at its proximal end.

A tubular drive shaft is coaxially mounted around the boring bar, and is arranged to rotate with the boring bar and cutting head. The tubular drive shaft has a second planetary gear assembly at its proximal end, adjacent to and distally situated with respect to the first planetary gear assembly. The planetary gear ratios for the first and second planetary gear assemblies are suitably the same. The two assemblies may have sun, planet and ring gears with differing numbers of teeth but with the gear ratios the same for each assembly. Gears of a different module (tooth size) may be employed, resulting in gears of different size. As the second planetary gear arrangement surrounds the tubular drive shaft and the first assembly only surrounds the feed screw, there may be some advantage for constructional purposes in having the planetary gear assemblies with differing overall sizes but the same planetary gearing ratios. Alternatively, the first and second planetary gear assemblies are substantially mutually similar in shape and in size of the sun gears, planetary gears and ring gears to ensure that the planetary gear ratios for the two assemblies are the same.

In use, in the apparatus of the first aspect of the invention, the feed screw is held rotatably mounted in the tubular drive shaft, for instance using suitable bearings, with the tubular drive shaft supported in a manner to allow it to freely rotate about the axis, using suitable bearings, in a support assembly whereby it may be held at a fixed distance from the workpiece. The boring bar and cutting head is moved relative to the workpiece by moving it along the feed screw by means of rotation of the feed nut of the boring bar relative to the feed screw. The tubular drive shaft is connected to the boring bar by a means that allows the drive shaft to drive the rotation of the boring bar about the axis, the boring bar rotation in unison with the tubular drive shaft, but which also permits the traversing movement of the boring bar back and forth along the axis. A suitable arrangement may be a splined coupling to the drive shaft with splines (i.e. ribs or fins) parallel to the axis and arranged to mate snugly with parallel grooves or slots inside the threaded sleeve of the cutting head whereby the cutting head may be driven to rotate by the splines, but may slide along the axis by the splines sliding along the mating grooves to permit axial traversal of the cutting head relative to the drive shaft. In another suitable arrangement the boring bar may be provided with external keys at its proximal end, for instance two or more such keys may be provided, with the keys arranged to slide in complementary internal grooves which run along the length of the inner face of the tubular drive shaft.

A drive motor is operably connected to rotate the tubular drive shaft and consequently the boring bar and cutting head at a cutting rotation velocity, up to a maximum cutting rotation velocity, about the axis. This drive motor may be mounted in the support assembly and may be geared to drive the drive shaft.

The carriers of the planetary gears of the first and second planetary gear assemblies are rigidly interconnected, whereby the carriers rotate in unison about the axis. The carriers include the axles upon which the planet gears rotate and the axles may be locked together through the carriers in any suitable manner to ensure that the carriers, holding the rotating planet gears, move together in unison around the axis. In other words, there may be a single carrier that includes or locates the axles for all the planetary gears and for both planetary gear assemblies. The axles do not necessarily have to pass through the carrier and carry a planetary gear from each arrangement as shown in the embodiments below, and in fact the planet gears from one planetary gear arrangement do not have to be coaxial with the planet gears from the other Planetary gear arrangement. For example, the carrier could carry six stub axles—all on different centres—three for each planetary gear assembly.

A primary feed motor is arranged to drive a primary feed drive shaft operably geared to a face of a ring gear of one of the planetary gear assemblies, called hereinafter the primary feed planetary gear assembly. The primary feed motor will suitably have a gearing arrangement between it and the primary feed drive shaft, rather than driving the primary feed drive shaft directly. The ring gear of that primary feed planetary gear assembly is rotatably drivable by the primary feed motor through the primary feed drive shaft having a drive pinion geared to an inner or outer face of the ring gear. The ring gear of the other planetary gear assembly is arrangeable to be held with zero rotational speed or to be independently rotatable about the axis. It may be held to prevent its rotation about the axis, and may be lockable to prevent its rotation about the axis. Alternatively, it may be driven to rotate independently of the ring gear of the primary feed planetary gear assembly.

When the ring gear of the other planetary gear assembly is locked or held stationary, with zero rotational speed, the feed screw is driven though the two planetary gear assemblies to rotate at the same rotational velocity $\omega_1$ as the tubular drive shaft, provided that the primary feed motor is stationary so that the ring gear to which it is geared is also stationary.

When the primary feed motor is rotated to drive the primary feed drive shaft at a rotational velocity $\omega_2$, the arrangement of the two planetary gear assemblies leads to a rotational velocity difference proportional to $\omega_2$ being combined with that of the tubular drive shaft and applied to the feed screw, so that the difference between the feed screw rotational velocity and the boring bar rotational velocity is a rotational velocity difference proportional to $\omega_2$.

The apparatus of the first aspect of the invention may further comprise a secondary feed motor arranged to drive a secondary feed drive shaft operably geared to the ring gear of the other planetary gear assembly whereby the ring gear of that other planetary gear assembly is rotatably drivable by the secondary feed motor as a secondary feed planetary gear assembly. The secondary feed motor will suitably have a gearing arrangement between it and the secondary feed drive shaft, rather than driving the secondary feed drive shaft directly.

This arrangement is of particular use for providing a capability to rapidly axially traverse the boring bar/cutting head using the secondary feed motor with the first feed motor used for slow axial movement of the boring bar/cutting head. The first and second planetary gear assemblies combine the inputs form the primary and secondary feed motors so that if the primary feed motor is stationary, the secondary feed motor can drive the axial movement of the cutting head and if the secondary feed motor is stationary, the primary feed motor can be used to drive the axial movement of the cutting head. The arrangement is also functional if both feed motors are rotating, so, for instance, should an emergency occur whilst cutting, with the primary feed motor driving axial motion of the cutting head, the secondary feed motor may be switched on to rapidly withdraw the cutting head from the workpiece without the need to first stop the primary feed motor.

Another arrangement suitable for use with the apparatus of the invention to provide capability for both slow and rapid axial movement of the cutting head may use a further (third) planetary gear arrangement situated in the drive train from the primary feed motor drive to the ring gear of the primary planetary gear arrangement, driven by the primary feed motor, whereby the inputs of the primary feed motor may be combined with a further input from a secondary feed motor. Hence, the primary feed motor may be operably connected to drive the primary drive shaft through a third planetary gear arrangement arranged to combine input from the primary feed motor with a further input from a secondary feed motor to give a combined output to the primary drive shaft. The ring gear of the other of the first and second planetary gear assemblies may be held stationary, with zero rotational speed, with this arrangement.

Another arrangement suitable for use with the apparatus of the invention to provide capability for both slow and rapid axial movement of the cutting head may use a double clutch arrangement situated in the drive train to the ring gear of the primary planetary gear arrangement, whereby either the primary feed motor or a secondary feed motor may be connected through the drive train to rotate the primary feed drive shaft. Hence, either the primary feed motor or the secondary drive motor may be operably connected to drive the primary drive shaft through a double clutch arrangement. The ring gear of the other of the first and second planetary gear assemblies may be held stationary (i.e. with zero rotational speed) with this arrangement. In other words, the boring apparatus of the invention may further comprise a secondary feed motor, wherein either the primary or secondary feed motor is operably connected to drive the primary drive shaft through a double clutch arrangement whereby at least two selectable speed ranges for the primary drive shaft are obtainable.

Another arrangement to provide both a rapid feed and a slow feed of the cutting head along the axis, suitable for use in the invention and using solely the primary feed motor drive, involves operably gearing the primary feed motor drive the ring gear of the primary planetary gear assembly through the primary drive shaft—keeping the ring gear of the other planetary gear assembly fixed. In such an arrangement, the primary feed motor drive may be operably connected to drive the primary drive shaft through a gear-box arranged to provide at least two selectable speeds for the primary drive shaft, with a slow speed selected for slow axial feed of the boring bar and a fast speed selected for rapid axial feed of the boring bar respectively.

The primary feed motor may suitably be arrangeable, by any of the means set out above, to drive the feed screw, through the primary planetary gear arrangement, so that the feed screw rotates at a rotation velocity from say 90 to 110%, for instance 95 to 105%, say 98% to 102% of the rotation velocity of the boring bar, in order to provide a suitable slow feed rate.

For the rapid feed rate, provided by one of the means set out hereinbefore, the feed screw is suitably driven to provide a suitable rapid feed rate: it may well be that the boring bar is not rotating whilst rapid feeding is carried out, but the invention is also suitable for providing rapid feed whilst the boring bar is rotating.

The apparatus of the first aspect of the invention may further comprise an indicator means arranged to provide an indication of the position of the cutter head, wherein the indicator means is driven through a gear arrangement by the primary feed motor. For instance, the indicator may be operably linked to the primary feed drive shaft. In other words, the apparatus of the invention may further comprise an indicator means arranged to provide an indication of the position of the cutter head, wherein the indicator means is driven through a gear arrangement operably connected to the primary feed drive shaft whereby the indicator means receives an input proportional to the velocity of the cutting head relative to the feed screw along the axis.

When a secondary feed motor is also present, used to provide a rapid axial feed capability in the apparatus of the invention by driving the secondary planetary gear arrangement as set out above, the indicator means may be driven through a differential gear arrangement operably connected to combine rotations of the primary and secondary feed drive shafts whereby the indicator means receives an input proportional to the velocity of the cutting head relative to the feed screw along the axis. This arrangement may be simplified further by selecting gear ratios for the primary and secondary drive pinions such that k and k' have the same numerical value.

This is a particularly advantageous feature of the invention, in that it allows a means for indication of cutting head position (typically a mechanical rotation counter and/or a nut on a thread driving a pointer along a scale) to be linked to the feed drive motor(s) with a directly proportional relationship between the number of revolutions of the feed screw relative to the boring bar, as driven by the feed drive shafts. In other words, the output to the indicator device is proportional to the difference in angular velocity between the feed screw and boring bar and hence provides the information, to the indicator means, needed to derive the cutting head and boring bar axial position.

Typically, hydraulic motors are not controllable to operate at very low rotation speeds and may have a minimum operating speed: i.e. they may not be continuously operable between being stationary and rotating at a maximum speed, but instead are either stationary (rotation speed=zero) or if rotating, have a minimum rotation speed. The primary feed motor may suitably be a hydraulic motor operable at a minimum primary feed rotation velocity and at a maximum primary feed rotation velocity wherein the ratio of minimum primary feed rotation velocity to maximum primary velocity rotation velocity is from 1:10 to 1:30. The primary feed motor may also be arrangeable to be stationary in order to lock the primary planetary ring gear to which the primary feed motor is operably geared.

The secondary feed motor, if present, may be a hydraulic motor operable at a minimum secondary feed rotation velocity and at a maximum secondary feed rotation velocity wherein the ratio of minimum secondary feed rotation velocity to maximum secondary feed rotation velocity is from 1:10 to 1:30. The secondary feed motor may also be arrangeable to be stationary in order to lock the secondary planetary ring gear to which it may be operably geared.

Each planetary gear assembly typically may comprise three or more planet gears substantially uniformly distributed around the respective sun gear, for the sake of improved operational stability, but the arrangement of the invention is also operable with only two planet gears, or even a single planet gear in each planetary gear assembly.

The boring apparatus of the first aspect of the invention may be a hot-tap drilling apparatus suitable for drilling a hole into a wall of a pressurised pipe, wherein the cutting head comprises a hole saw cutter and pressure-tight seals around the boring bar whereby pressurised contents of said pipe are prevented from escaping the pipe and/or entering other components of the hot tap drilling apparatus.

The second aspect of the invention provides a method for controlling axial movement of the cutting head of a boring apparatus according to the first aspect of the invention whilst the cutting head (and hence tubular drive shaft) is rotating at a cutting rotation velocity $\omega_1$.

The method involves operating the primary feed drive motor to drive the primary feed drive shaft at rotation velocity $\omega_2$ with the ring gear of the other or secondary feed planetary gear drive locked or held with rotation velocity zero. The feed screw is driven through the first and second planetary gear assemblies at a rotation velocity $(\omega_1 + k \cdot \omega_2)$. The gear ratio k may be positive or negative depending upon the selection of which planetary gear assembly is used as the primary feed planetary gear assembly.

The value and sign of k is determined by the proportions of the planetary gear assemblies and the gear ratio between a drive pinion of the drive shaft of the primary feed motor and the gear teeth on the ring gear being driven.

This leads to a relative rotational velocity between the feed screw and the feed nut of the boring bar of $k \cdot \omega_2$, causing the boring bar to move axially along the feed screw at a rate $P \cdot k \cdot \omega_2$.

For the methods of the invention, $\omega_1$ may be 0, or may be any achievable rotational velocity up to the maximum cutting rotational velocity. Hence, axial traversal of the cutting head along the axis by the feed drive motor(s), through the planetary gear assemblies, whilst the cutting head is not rotating, is also within the scope of the invention.

When the apparatus of the first aspect of the invention further comprises a secondary feed motor arranged to drive a secondary feed drive shaft operably geared to a face of the ring gear of the other planetary gear assembly to act as a secondary feed planetary gear assembly, the method of the second aspect of the invention may comprise operating the primary feed drive motor to drive the primary feed drive shaft at rotation velocity $\omega_2$, where $\omega_2$ may be 0, and operating the secondary feed drive motor to drive the secondary feed drive shaft at rotation velocity $\omega_3$.

The feed screw is driven through the first and second planetary gear assemblies at a rotation velocity $\omega_1 + k \cdot \omega_2 - k' \cdot \omega_3$. The gear ratios k and k' are gear ratios determined by the proportions of the planetary gear assemblies and the gear ratio between drive pinions from the shafts of the primary and secondary feed motors and the gear teeth on the ring gears being driven. The values of k or k' may be positive or negative depending upon which of the first or second planetary gear assemblies is selected as primary feed planetary gear assembly and the positions of the respective feed motors. Typically, the drive pinions and ring gears may be arranged such that k and k' have the same numerical value (but may have the same or different signs).

The relative rotational velocity between the feed screw and the feed nut of the boring bar will be $k \cdot \omega_2 - k' \cdot \omega_3$, causing the cutting head to move axially along the feed screw at a rate $P \cdot (k \cdot \omega_2 - k' \cdot \omega_3)$.

The invention provides a reliable means for traversing the cutting head of a boring apparatus, using a primary feed drive motor and optionally a secondary feed drive motor in a manner which permits highly accurate control of the slow feed rate to be used when the boring bar is progressing the cutting head for cutting, whilst allowing direct mechanical measurement of the cutting head position. There is no requirement for accurate speed matching of two independent drive motors, and the gearing arrangement allows for continuously variable feed rates over a wide range. The provision of an optional secondary feed drive motor gives easy rapid traversing of the cutting head in a manner which also allows for continued mechanical monitoring of the cutting head position and which can be effected without the need to stop or disengage the primary feed motor (for instance in an emergency situation where rapid withdrawal of a cutting tool is required).

DETAILED DESCRIPTION OF THE DRAWINGS

Specific embodiments of the present invention will now be described, by way of example only, with reference to the accompanying drawings.

FIG. 1 shows a schematic cross-sectional side view of a boring apparatus according to an embodiment of the invention.

Figure 2:
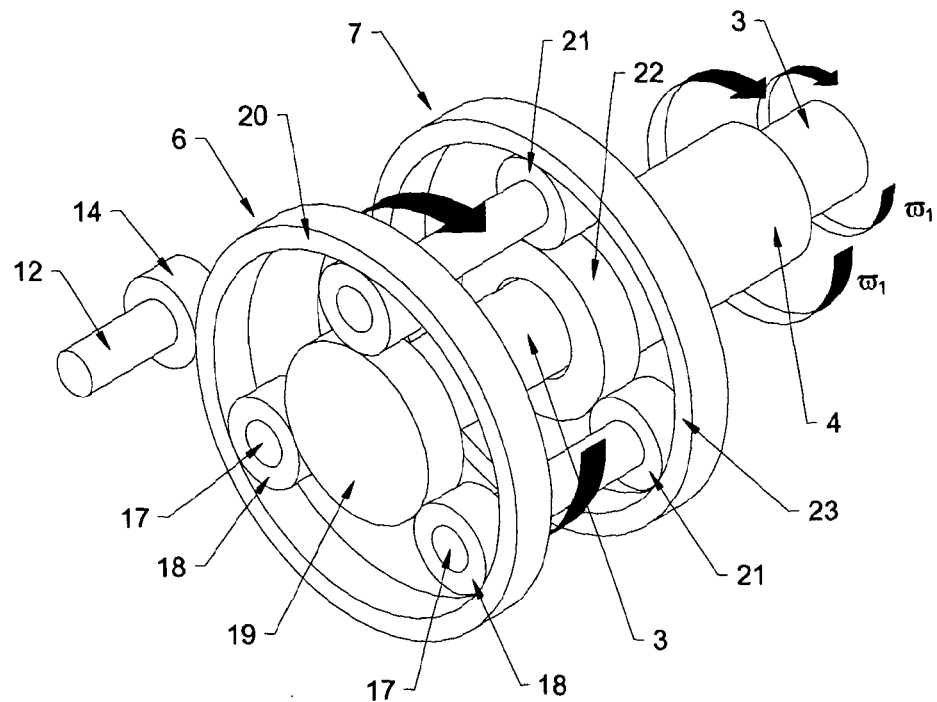

FIG. 2 shows a schematic perspective view of interconnected first and second planetary gear assemblies according to an embodiment of the invention, with the primary drive shaft 12 stationary, and with the feed screw 3 rotating at the same speed $\omega_1$ as the tubular drive shaft 4 driving the boring bar.

Figure 3:
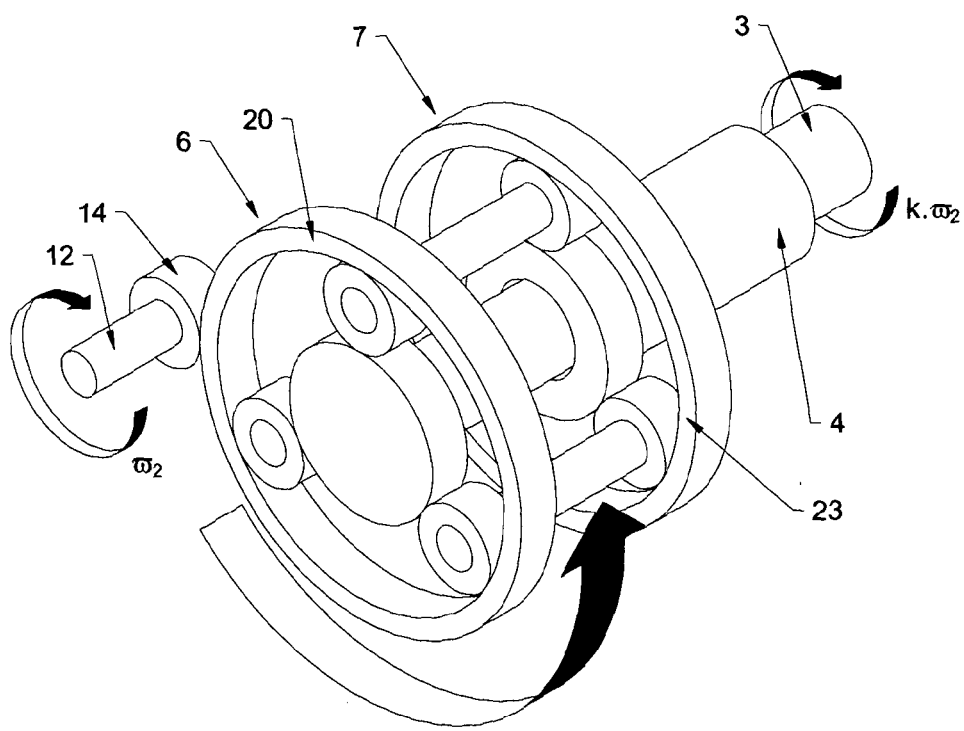

FIG. 3 shows the same gear arrangement as depicted in FIG. 2, but with the primary feed drive shaft rotating at speed $\omega_2$, and with the tubular drive shaft 4 and ring gear 23 of the second planetary gear assembly 7 stationary.

Figure 4:
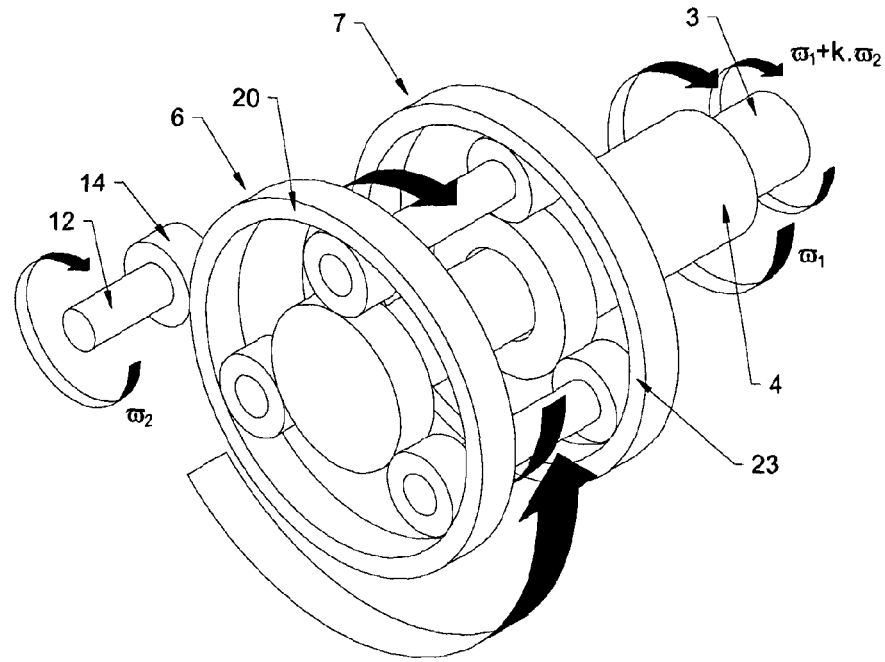

FIG. 4 shows a schematic perspective view of the same gear arrangement as depicted in FIGS. 2 and 3 but with the tubular drive shaft 4 rotating at rotational velocity $\omega_1$ and with the primary feed drive shaft 12 rotating at rotational velocity $\omega_2$.

Figure 5:
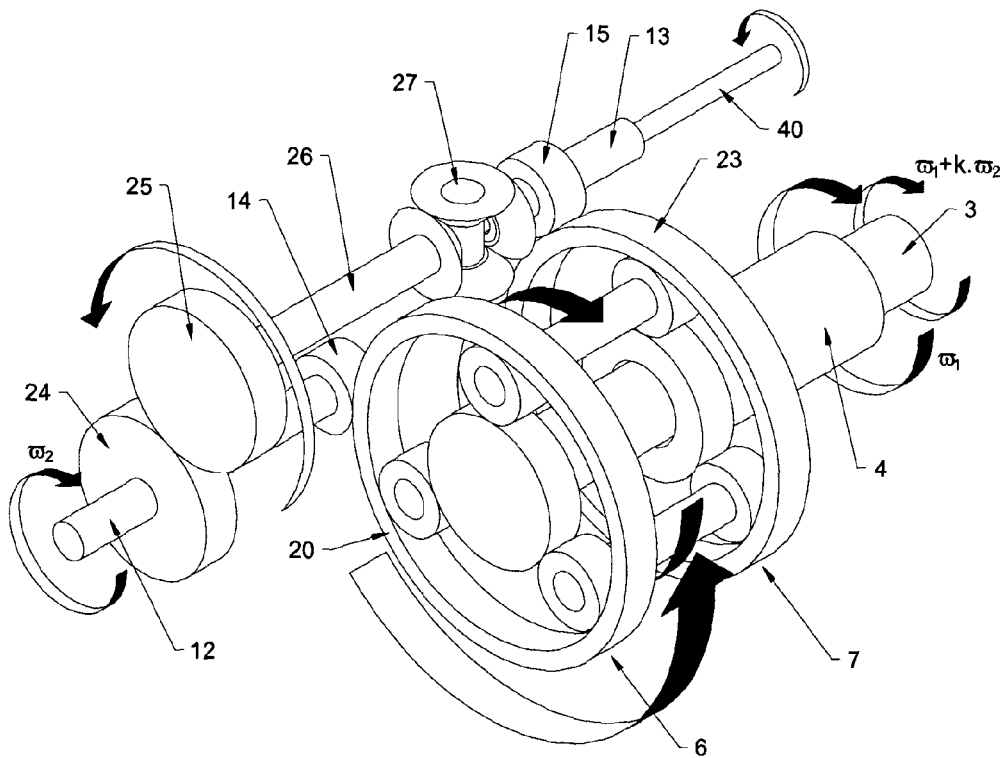

FIG. 5 shows a schematic perspective view of interconnected first and second planetary gear assemblies according to a further embodiment of the invention. Primary 12 and secondary 13 feed drive shafts are operably connected to a differential gear arrangement 27 to provide positional information to an indicator means (not shown) arranged to provide an indication of the position of the cutter head 5. In the arrangement shown, the tubular drive shaft 4 is rotating at velocity $\omega_1$ with the primary drive shaft 12 rotating at velocity $\omega_2$, and with the secondary drive shaft 13 stationary.

Figure 6:
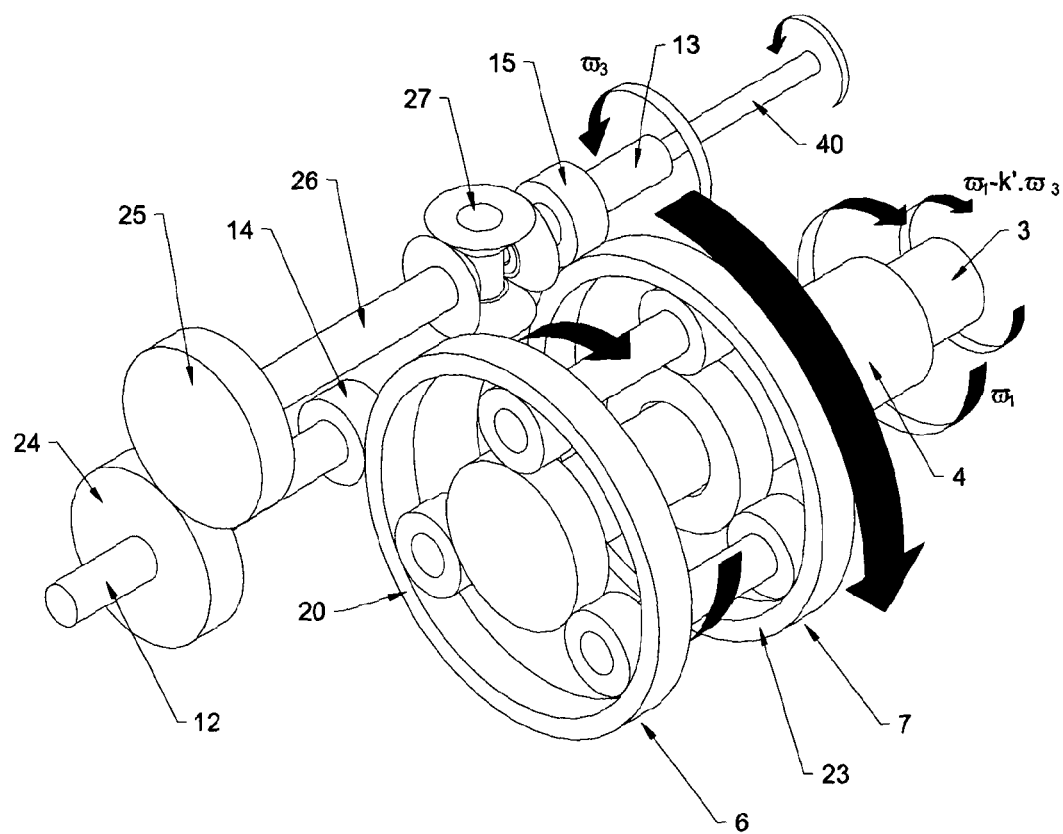

FIG. 6 shows the same arrangement of gears as in FIG. 5, but with the primary drive shaft 12 stationary, the tubular drive shaft 4 rotating at velocity $\omega_1$ and the secondary drive shaft 13 rotating at velocity $\omega_3$.

Turning to FIG. 1, this shows a boring apparatus arranged for cutting through a pipeline (not shown) or the like using a cutting head 5. In use, the apparatus is typically supported by a support structure (not shown) to hold it in position with the housing 1 held rigidly at a fixed location relative to the pipeline, typically with the long axis of the apparatus normal to the long axis of the pipeline to be drilled.

A drive motor and reduction gearbox 9 is also held within the housing 1. This may be a hydraulic motor. Drive gear 10 is turned by the drive motor and reduction gearbox 9 and engages with gear 11 which is connected to turn the tubular drive shaft 4 about its long axis. Concentric with the tubular drive shaft 4, the boring bar 2 is driven to rotate in unison with the tubular drive shaft 4 by means of drive keys 30 which are configured to allow the boring bar to move or slide axially relative to the tubular drive shaft 4, whilst enabling the rotational drive of the tubular drive shaft 4 to be conveyed to the boring bar 2. Hence, in use, the tubular drive shaft and the boring bar always rotate with the same angular velocity as each other, about the long axis.

The feed screw 3 is mounted for rotation about the long axis concentrically with the boring bar 2 and is arranged to be able rotate independently relative to it. The feed screw 3 has a threaded exterior arranged to mate with a feed nut 16 rigidly mounted to the interior of the boring bar 2, so that relative rotation between the feed screw 3 and the boring bar 2 leads to the boring bar 2 traversing axially relative to the feed screw 3, with the axial movement driven by the feed screw 3 turning relative to the drive nut 16. The feed screw 3 is directly connected to the sun gear 19 of the first planetary gear assembly 6. The tubular drive shaft 4 is directly connected to the sun gear 22 of the second planetary gear assembly 7.

For the embodiment shown in FIG. 1, a primary feed motor (not shown) has a primary feed drive shaft 12 geared to the ring gear 20 of the first planetary gear assembly 6 through a primary drive pinion 14.

In the embodiment shown, no secondary feed motor or secondary feed drive shaft is present. When present, a secondary feed motor may be geared through a secondary drive shaft 13, for instance as indicated in FIGS. 5 and 6, and through secondary drive pinion 15 to the ring gear 23 of the second planetary gear assembly 7.

Also shown in FIG. 1 is the carrier 8 for the planet gears 18, 21 of the first and second planetary gear assemblies 6, 7. The planet gears 18, 21 for each planetary gear assembly rotate on shared axles 17 held by the carrier 8. Only one axle 17 is shown in FIG. 1, but the individual axles 17 can be seen in FIGS. 2 to 6 where the carrier 8 has been omitted for the sake of clarity.

FIGS. 2 to 4 show the planetary gear assemblies at the proximal end of the boring apparatus in more detail. For the sake of clarity, gear teeth and screw threads have been omitted from FIGS. 2 to 4. Also, the carrier 8 for the planetary gears has been removed from the diagrams so that the planetary gear assembly can be seen more clearly. For the first planetary gear assembly 6 the feed screw 3 is directly connected to the sun gear 19 at the centre of the first planetary gear assembly 6. The feed screw 3 can be seen passing through the hollow centre of the tubular drive shaft 4. For the second planetary gear assembly 7, the central sun gear 22 is directly connected to the tubular drive shaft 4. For the embodiment shown in FIGS. 2 and 3, the ring gear 23 of the second planetary gear assembly 7 is held stationary. The planet gears 18 for the first planetary gear assembly 6 are rotatably mounted on axles 17. These axles are held rigidly spaced relative to each other by the carrier 8 (not shown in FIGS. 2 to 6), and also act as axles for the planet gears 21 of the second planetary gear assembly 7. Hence, the axles 17 and planet gears 18 and 21 all rotate in unison about the central axis along with carrier 8 which holds the axles 17 mutually spaced.

A primary feed motor (not shown) is arranged to drive a primary feed drive shaft 12 geared to the ring gear 20 of the first planetary gear assembly 6 through a primary drive pinion 14.

In use, when the primary feed drive shaft 12 is stationary, as shown in FIG. 2, the tubular drive shaft 4 is driven by the drive motor and reduction gearbox 9 through the gear arrangement 10, 11 to rotate at rotation velocity $\omega_1$. This rotational velocity is fed, through the sun gear 22, with the ring gear 23 held stationary, through the planet gears 21 and axles 17 to the first planetary gear assembly 6 so that the sun gear 19, is also driven at rotational velocity $\omega_1$, resulting in the feed screw 3 also having the same rotational velocity. Hence, the tubular drive shaft 4 and feed screw 3 rotate with the same rotational velocity $\omega_1$, and so the screw thread on the feed screw 3 does not drive the feed screw 3 axially relative to the tubular drive shaft 4. Hence, the boring bar 2 and cutting head 5 rotate about the central axis without any movement along the axis.

FIG. 3 shows what happens when the primary feed drive shaft 12 is rotated at a rotational velocity $\omega_2$ whilst the drive motor and reduction gearbox 9 is stationary so that the tubular drive shaft 4 is not rotating. The ring gear 23 of the second planetary gear assembly 7 is also held stationary. As a result of the rotation of the primary feed drive shaft 12, the feed screw 3 is driven to rotate, through the planetary gear assemblies 6, 7 at a rotational velocity $k \cdot \omega_2$, where k is a gear in ratio dependent upon how the drive pinion 14 is geared to the ring gear 20 of the first planetary gear assembly 6, and also dependent upon the planetary gear ratio used. Although the drive pinion 14 is shown geared to the outer face of the ring gear 20, it may alternatively drive the inner face of ring gear 20. The relative rotational movement between the feed screw 3 and the tubular drive shaft 4, caused by the rotation of the primary feed drive shaft 12, will lead to the screw thread on the feed screw 3 engaging with the drive nut 16 to cause the boring bar 4 to traverse with the cutting head 5 along the axis at a rate $P \cdot k \cdot \omega_2$, where P is the pitch of the screw thread.

FIG. 4 shows what happens when the primary feed drive shaft 12 is rotated at a rotational velocity $\omega_2$ whilst the drive motor and reduction gearbox 9 is rotating the tubular drive shaft 4 at an angular velocity $\omega_1$. The ring gear 23 of the second planetary gear assembly 7 is still held stationary. Through the planetary gear assemblies 6, 7, the rotational velocity from the primary feed drive shaft 12 is combined with the rotational velocity from the tubular drive shaft 4 to give an overall rotational velocity for the drive screw 3 of $\omega_1 + k \cdot \omega_2$, whilst the tubular drive shaft 4, holding the feed nut 16, is rotating at angular velocity $\omega_1$. This relative rotational movement of $k \cdot \omega_2$ between the feed screw 3 and the tubular drive shaft 4 will lead to the screw thread on the feed screw 3 engaging with the drive nut 16 to cause the boring bar 4 and cutting head 5 to traverse along the axis at a rate $P \cdot k \cdot \omega_2$, where P is the pitch of the screw thread.

FIGS. 5 and 6 show an alternative arrangement for the planetary gear assemblies 6, 7 at the proximal end of the boring apparatus. Again, for the sake of clarity, gear teeth and screw threads have been omitted from the drawings. Also, the carrier 8 for the planet gears 18, 21 has been removed from the diagrams so that the planetary gear assembly can be seen more clearly. Again, for the first planetary gear assembly 6 the feed screw 3 is directly connected to the sun gear 19 at the centre of the first planetary gear assembly 6. The feed screw 3 can be seen passing through the hollow centre of the tubular drive shaft 4. For the second planetary gear assembly 7, the central sun gear 22 is directly connected to the tubular drive shaft 4.

A primary feed motor (not shown) is arranged to drive a primary feed drive shaft 12 geared to the ring gear 20 of the first planetary gear assembly 6 through a primary drive pinion 14. A secondary feed motor is geared through a secondary drive shaft 13 and through a secondary drive pinion 15 to the ring gear 23 of the second planetary gear assembly 7.

A differential gear arrangement 27 is operably connectable to an indicator means (not shown) which may be used to provide an indication of the position of the cutting head 5 relative to the housing of the boring apparatus. The secondary drive shaft 13 and primary drive shaft 12 are both geared to the differential gear arrangement 27. For the secondary drive shaft 13, there is a direct gearing to the differential gear arrangement 27 whilst for the primary drive shaft 12, an additional drive shaft 26 is used to provide a connection through the gears 24, 25 as shown in the Figure. The differential gear 27 combines the rotational velocities fed to it to rotate shaft 40 with a net rotational velocity corresponding to combined rotational velocities for the primary 12 and secondary 13 drive shafts. Shaft 40 is rotatably mounted concentrically within the secondary drive shaft 13 in the embodiment shown.

For FIG. 5, the ring gear 23 of the second planetary gear assembly 7 is held stationary by the static, secondary drive shaft 13 and its drive pinion 15. The primary feed drive shaft 12 is rotated at a rotational velocity $\omega_2$ whilst the drive motor and reduction gearbox 9 rotates the tubular feed shaft 4 at rotational velocity $\omega_1$ As a result of the rotation of the primary feed drive shaft 12, the feed screw 3 is driven to rotate, through the planetary gear assemblies 6, 7 at a rotational velocity $\omega_1+k\cdot\omega_2$, where k is the gearing ratio dependent upon how the drive pinion 14 is geared to the ring gear 20 of the first planetary gear assembly 6, and also dependent upon the planetary gear ratio used. The relative rotational movement between the feed screw 3 and the tubular drive shaft 4, caused by the rotation of the primary feed drive shaft 12, will lead to the screw thread on the feed screw 3 engaging with the drive nut 16 to cause the boring bar 4 and cutting head 5 to traverse along the axis at a rate $P\cdot k\cdot\omega_2$, where P is the pitch of the screw thread.

The differential gear arrangement 27 will provide an input to the indicator means proportional to $\omega_2$, through rotation of shaft 40. This rotation of shaft 40 is in turn proportional to the linear velocity of the boring bar 2 and cutting head 5 relative to the housing 1 of the boring apparatus. This input from shaft 40 may be used by the indicator means to derive positional information for the cutting head 5.

For FIG. 6, the ring gear 20 of the first planetary gear assembly 6 is held stationary by the static, primary drive shaft 12 and its drive pinion 14. The secondary feed drive shaft 13 is rotated at a rotational velocity $\omega_3$ (which is negative as shown, using the convention that clockwise rotation viewed along the long axis from the proximal to the distal end is positive) whilst the drive motor and reduction gearbox 9 rotates the tubular feed shaft 4 at rotational velocity $\omega_1$ As a result of the rotation of the secondary feed drive shaft 13, the feed screw 3 is driven to rotate, through the planetary gear assemblies 6, 7 at a rotational velocity $\omega_1-k'\cdot\omega_3$, where k' is the gearing ratio dependent upon how the drive pinion 15 is geared to the ring gear 23 of the second planetary gear assembly 7, and also dependent upon the planetary gear ratio used. Because $\omega_3$ is negative for the circumstances shown in the Figure, the rotational speed of the feed screw will be $|\omega_1|+k'\cdot|\omega_3|$ where $|\omega_1|$ and $|\omega_3|$ represent the magnitudes (i.e. rotational speeds) of the tubular feed shaft and secondary feed drive shaft respectively. The relative rotational movement between the feed screw 3 and the tubular drive shaft 4, caused by the rotation of the secondary feed drive shaft 13, will lead to the screw thread on the feed screw 3 engaging with the drive nut 16 to cause the boring bar 4 and cutting head 5 to advance along the axis at a rate $P\cdot k'\cdot|\omega_3|$, where P is the pitch of the screw thread. If $\omega_3$ were positive in rotation direction, rather than negative, then the boring bar 4 and cutting head 5 would traverse along the axis at a rate $-P\cdot k'\cdot|\omega_3|$, leading to retraction of the cutting head.

The differential gear arrangement 27 will provide an input to the indicator means, through shaft 40, proportional to $\omega_3$ which is in turn proportional to the linear velocity of the boring bar 2 and cutting head 5 relative to the housing 1 of the boring apparatus caused by rotation of the secondary drive shaft 13. This input provided through shaft 40 may be used by the indicator means to derive positional information for the cutting head 5.

Suitably, the gears are arranged so that k and k' have the same numerical value. Hence, it can be seen that in use for such a case, when both or either of the primary and secondary feed shafts 12, 13 are rotating, with or without the drive motor and reduction gearbox 9 turning the tubular drive shaft 4, the differential gear arrangement 27 may be used to combine the inputs from the drive shafts 12, 13 to give an input to the indicator means proportional to the linear velocity of the cutting head 5, whereby the indicator means may be used to provide positional information regarding the location of the cutting head 5 axially, relative to the housing 1.

In a typical arrangement, the primary drive shaft 12 may be driven by a slow primary feed motor arranged to provide a low linear axial traversing speed through the planetary gear assemblies of the invention, with the secondary drive shaft 13 driven by a fast secondary feed motor arranged to provide a high linear axial traversing speed through the planetary gear assemblies of the invention. Input from the primary and secondary motors may be used, as set out in these embodiments, to provide slow or fast axial movement of the cutting head 5 relative to the housing 1 as desired, with the option for direct monitoring of the cutting head 5 position through the differential gear arrangement 27.

Hence, the feed screw may be driven through the first and second planetary gear assemblies at a rotation velocity $\omega_1+k\cdot\omega_2-k'\cdot\omega_3$, depending upon the rotation direction used for each drive shaft, whereby the relative rotational velocity between the feed screw and the boring bar is $k\cdot\omega_2-k'\cdot\omega_3$, causing the cutting head and boring bar to move axially along the feed screw at a rate $P\cdot(k\cdot\omega_2-k'\cdot\omega_3)$.

It will be appreciated that numerous modifications to the above described embodiments may be made without departing from the scope of the invention as defined in the appended claims. For example, fast and slow feed rates may be provided through a single primary feed motor, using the arrangements shown in FIGS. 2 to 4, but with the drive from a primary feed motor fed to the primary drive shaft 12 through a gear box to provide slow or fast feed rates.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A boring apparatus comprising:
  a feed screw mounted to rotate about its axis having a first planetary gear assembly at its proximal end,
  a cutting head and boring bar coaxially mounted on the feed screw by a feed nut whereby rotation of the feed nut by one full rotation relative to the feed screw causes movement of the cutting head by a distance P along the axis,
  a tubular drive shaft coaxially mounted around the boring bar, operably connected to the boring bar to rotate the boring bar about its axis and to permit relative axial movement between the boring bar and the tubular driveshaft, and having a second planetary gear assembly at its proximal end, situated adjacent to and distally situated with respect to the first planetary gear assembly, a drive motor operably connected to rotate the tubular drive shaft, boring bar and cutting head at a cutting rotation velocity, from zero up to a maximum cutting rotation velocity, about the axis, wherein each of the first and second planetary gear assemblies has a central sun gear, around which one or more planetary gears orbit, and an annular ring gear, which surrounds both the sun gear and the one or more planetary gears;

carriers of the planetary gears of the first and second planetary gear assemblies, which are rigidly interconnected, whereby the carriers rotate in unison about the axis, wherein a primary feed motor is arranged to drive a primary feed drive shaft operably geared to a face of a ring gear of one of the planetary gear assemblies whereby that planetary gear assembly is rotatably drivable by the primary feed motor to act as a primary feed planetary gear assembly, and wherein the ring gear of the other planetary gear assembly is arrangeable to be held with zero rotational speed or to be independently rotatable about the axis.

2. A boring apparatus according to claim 1 wherein the primary feed motor is operably connected to drive the primary drive shaft through a gear-box arranged to provide at least two selectable speed ranges for the primary drive shaft.

3. A boring apparatus according to claim 1 wherein the primary feed motor is operably connected to drive the primary drive shaft through a third planetary gear assembly arranged to combine input from the primary feed motor with a further input from a secondary feed motor to give a combined output to the primary drive shaft.

4. A boring apparatus according to claim 3 wherein the secondary feed motor is a hydraulic motor operable at a minimum secondary feed rotation velocity and at a maximum secondary feed rotation velocity wherein the ratio of minimum secondary feed rotation velocity to maximum secondary feed rotation velocity is from 1:10 to 1:30.

5. A boring apparatus according to claim 1, further comprising a secondary feed motor, wherein either the primary or secondary feed motor is operably connected to drive the primary drive shaft through a double clutch arrangement whereby at least two selectable speed ranges for the primary drive shaft are obtainable.

6. A boring apparatus according to any of claims 1 to 5 further comprising an indicator means arranged to provide an indication of the position of the cutter head, wherein the indicator means is driven through a gear arrangement operably connected to the primary feed drive shaft whereby the indicator means receives an input proportional to the velocity of the cutting head relative to the feed screw along the axis.

7. A boring apparatus according to claim 1 further comprising a secondary feed motor arranged to drive a secondary feed drive shaft operably geared to a face of the ring gear of the other planetary gear assembly whereby the other planetary gear assembly is rotatably drivable by the secondary feed motor to act as a secondary feed planetary gear assembly.

8. A boring apparatus according to claim 7 further comprising an indicator means arranged to provide an indication of the position of the cutter head, wherein the indicator means is driven through a differential gear arrangement operably connected to combine rotations of the primary and secondary feed drive shafts whereby the indicator means receives an input proportional to the velocity of the cutting head relative to the feed screw along the axis.

9. A boring apparatus according to claim 1 wherein the primary feed motor is a hydraulic motor operable at a minimum primary feed rotation velocity and at a maximum primary feed rotation velocity wherein the ratio of minimum primary feed rotation velocity to maximum primary velocity rotation velocity is from 1:10 to 1:30.

10. A boring apparatus according to claim 1 wherein each planetary gear assembly comprises three or more planetary gears substantially uniformly distributed around the sun gear.

11. A boring apparatus according to claim 1 which is a hot-tap drilling apparatus suitable for drilling a hole into a wall of a pressurised pipe, wherein the cutting head comprises a hole saw cutter and pressure-tight seals around the boring bar whereby pressurised contents of said pipe are prevented from escaping the pipe and/or entering other components of the hot-tap drilling apparatus.

12. A method for controlling axial movement of a cutting head of a boring apparatus whilst the cutting head is rotating at a cutting rotation velocity $\omega_1$, the method comprising:

providing a boring apparatus including:

a feed screw mounted to rotate about its axis having a first planetary gear assembly at its proximal end, a cutting head and boring bar coaxially mounted on the feed screw by a feed nut whereby rotation of the feed nut by one full rotation relative to the feed screw causes movement of the cutting head by a distance P along the axis, a tubular drive shaft coaxially mounted around the boring bar, operably connected to the boring bar to rotate the boring bar about its axis and to permit relative axial movement between the boring bar and the tubular driveshaft, and having a second planetary gear assembly at its proximal end, situated adjacent to and distally situated with respect to the first planetary gear assembly, a drive motor operably connected to rotate the tubular drive shaft, boring bar and cutting head at a cutting rotation velocity, from zero up to a maximum cutting rotation velocity, about the axis, carriers of the planetary gears of the first and second planetary gear assemblies, which are rigidly interconnected, whereby the carriers rotate in unison about the axis, a primary feed motor arranged to drive a primary feed drive shaft operably geared to a face of a ring gear of one of the planetary gear assemblies whereby that planetary gear assembly is rotatably drivable by the primary feed motor to act as a primary feed planetary gear assembly, and wherein the ring gear of the other planetary gear assembly is arrangeable to be held with zero rotational speed or to be independently rotatable about the axis;

operating the primary feed drive motor to drive the primary feed drive shaft at rotation velocity $\omega_2$ with the ring gear of the other planetary gear assembly held with rotation velocity zero, whereby the feed screw is driven through the first and second planetary gear assemblies at a rotation velocity $(\omega_1 + k \cdot \omega_2)$ wherein k is a gear ratio, whereby the relative rotational velocity between the feed screw and the feed nut of the boring bar is $k \cdot \omega_2$, causing the boring bar to move axially along the feed screw at a rate $P \cdot k \cdot \omega_2$.

13. A method for controlling axial movement of a cutting head of a boring apparatus whilst the cutting head is rotating at a cutting rotation velocity the method comprising:

providing a boring apparatus including:
- a feed screw mounted to rotate about its axis having a first planetary gear assembly at its proximal end,
- a cutting head and boring bar coaxially mounted on the feed screw by a feed nut whereby rotation of the feed nut by one full rotation relative to the feed screw causes movement of the cutting head by a distance P along the axis,
- a tubular drive shaft coaxially mounted around the boring bar, operably connected to the boring bar to rotate the boring bar about its axis and to permit relative axial movement between the boring bar and the tubular driveshaft, and having a second planetary gear assembly at its proximal end, situated adjacent to and distally situated with respect to the first planetary gear assembly,
- a drive motor operably connected to rotate the tubular drive shaft, boring bar and cutting head at a cutting rotation velocity, from zero up to a maximum cutting rotation velocity, about the axis,
- carriers of the planetary gears of the first and second planetary gear assemblies, which are rigidly interconnected, whereby the carriers rotate in unison about the axis,
- a primary feed motor arranged to drive a primary feed drive shaft operably geared to a face of a ring gear of one of the planetary gear assemblies whereby that planetary gear assembly is rotatably drivable by the primary feed motor to act as a primary feed planetary gear assembly, and wherein the ring gear of the other planetary gear assembly is arrangeable to be held with zero rotational speed or to be independently rotatable about the axis;
- a secondary feed motor arranged to drive a secondary feed drive shaft operably geared to a face of the ring gear of the other planetary gear assembly whereby the other planetary gear assembly is rotatably drivable by the secondary feed motor to act as a secondary feed planetary gear assembly;

operating the primary feed drive motor to drive the primary feed drive shaft at rotation velocity $\omega_2$, operating the secondary feed drive motor to drive the secondary feed drive shaft at rotation velocity $\omega_3$, whereby the feed screw is driven through the first and second planetary gear assemblies at a rotation velocity $\omega_1 + k \cdot \omega_2 - k' \cdot \omega_3$ wherein k and k' are gear ratios, whereby the relative rotational velocity between the feed screw and the feed nut of the boring bar is $k \cdot \omega_2 - k' \cdot \omega_3$, causing the boring bar to move axially along the feed screw at a rate $P \cdot (k \cdot \omega_2 - k' \cdot \omega_3)$.

* * * * *